Patented June 16, 1936

2,044,045

UNITED STATES PATENT OFFICE 2,044,045

N,N-DIALKYLOL ANILINES AND PROCESS OF PRODUCING SAME

Alfred William Baldwin and Arthur Howard Knight, Blackley, Manchester, England, assignors to Imperial Chemical Industries Limited, a corporation of Great Britain No Drawing. Application March 27, 1934, Serial No. 717,682. In Great Britain March 29, 1933

19 Claims. (Cl. 260—128)

The present invention relates to new intermediates for dyestuffs, and to process of manufacturing them.

According to the invention we treat an o-aminophenylether substituted in the p-position to the ether grouping by either alkyl, alkoxy, or halogen, with ethylene chlorhydrin in an aqueous solution containing a mild alkali and we thus obtain in good yield the hitherto unknown compounds represented by the general formula

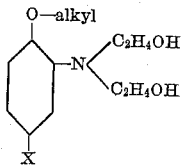

where X stands for alkyl, alkoxy, or halogen.

The invention is illustrated, but not limited, by the following examples, in which the parts are by weight.

Example 1.—N-$\beta,\beta'$-dihydroxydiethyl - 2,5 - dimethoxyaniline is prepared by boiling under reflux for 8 hours, with mechanical agitation, a mixture of 360 parts of 2,5-dimethoxyaniline, 3240 parts of aqueous ethylene chlorhydrin of 30% strength, 288 parts of chalk (calcium carbonate) and 72 parts of bentonite.

The bentonite is added in order to facilitate the reaction by dispersing the molten 2,5-dimethoxyaniline. The reaction product is then filtered, a clear filtrate being obtained. 300 parts of sodium carbonate are added to the hot filtrate and the mixture agitated for ten minutes at 70–80° C. This decomposes a soluble double compound of the desired N-$\beta,\beta'$-dihydroxydiethyl-2,5-dimethoxyaniline and calcium chloride by precipitating the calcium as calcium carbonate. The calcium carbonate is then filtered off from the hot liquor. The cooled filtrate is then extracted with ether, the ether distilled off, and the residue, which is a thick oil, distilled in vacuo; 304 parts of the desired N-$\beta,\beta'$-dihydroxydiethyl-2,5-dimethoxyaniline are obtained as a pale yellow viscous oil, boiling at 208–216° C/6 mm. N-$\beta,\beta'$-dihydroxydiethyl-2,5-dimethoxyaniline forms a hydrochloride which crystallizes in colourless prismatic rods from a mixture of methanol and ether, M. P. 148° C. It also forms a picrate obtained as clusters of bright yellow needles from a mixture of methanol and ether, M. P. 107–108° C.

Example 2.—N-$\beta,\beta'$-dihydroxydiethylcresidine is prepared by boiling under reflux for 8 hours, with mechanical agitation, a mixture of 160 parts cresidine (1-methyl-3-amino-4-methoxybenzene), 1625 parts aqueous ethylene chlorhydrin of 30% strength, 145 parts chalk (calcium carbonate) and 36 parts of bentonite.

The product is then filtered hot and the double compound of the desired N-$\beta,\beta'$-dihydroxydiethylcresidine and calcium chloride decomposed as in Example 1 by the addition of 150 parts of sodium carbonate to the hot filtrate. After agitating the mixture at 70–80° for 10 minutes the precipitated calcium carbonate is filtered off. The N-$\beta,\beta'$-dihydroxydiethylcresidine separates as a brownish oil in the filtrate and is separated from the aqueous layer.

The oil, which contains some water, is freed from the latter by distilling it off on a steam bath under a partial vacuum. The residue is then distilled in vacuo, 169 parts of the desired N-$\beta,\beta'$-dihydroxydiethylcresidine being obtained as an almost colourless viscous oil, B. P. 188°–199° C/5 mm.

Example 3.—N-$\beta,\beta'$-dihydroxydiethyl - 2,5 - diethoxyaniline is obtained by boiling under reflux for 8 hours, with mechanical agitation, a mixture of 210 parts of 2,5-diethoxyaniline, 1625 parts aqueous ethylene chlorhydrin of 30% strength, 145 parts chalk (calcium carbonate) and 36 parts of bentonite.

The reaction product is then filtered hot and the filtrate treated as described in Example 2. On distilling the crude product in vacuo, 193 parts of N-$\beta,\beta'$-dihydroxydiethyl - 2,5 - diethoxyaniline are obtained as a pale yellow oil, B. P. 224–230° C/12 mm.

Example 4.—47.5 parts of 4-chloro-2-aminoanisole, 447 parts of 30% ethylene chlorohydrin solution, 40 parts of calcium carbonate and 10 parts of bentonite are refluxed and agitated for 15 hours; 50 parts of sodium carbonate are then added, the mixture is stirred for a further 10 minutes, filtered hot and the oily layer separated from the filtrate. The oil is dried and distilled to yield a viscous, pale-yellow oil, B. P. 210–215° C/6 mm. The product, N-$\beta,\beta'$-dihydroxydiethyl-2-methoxy-5-chloroaniline, may be purified further by converting it to hydrochloride and recrystallizing this from a mixture of methyl alcohol and acetone to yield colourless prisms, M. P. 147–148° C.

Although in the above description the invention has been illustrated by reference to certain specific examples, it will be understood that the scope of the invention is not limited thereby. Thus, the alkoxyl group in position 1 may be methoxyl, ethoxyl, butoxyl and the like. Similarly, X may stand for any such alkoxyl group as those just mentioned, or for methyl, ethyl, propyl, amyl or the like, or for chlorine, bromine, fluorine, or the like.

As many apparently widely different embodiments may be made without departing from the spirit and scope of our invention we do not limit ourselves to the specific embodiments thereof except as defined in the following claims:

We claim:—

1. The process which comprises reacting at about 100° C. with agitation about 360 parts by weight of 2,5-dimethoxyaniline, about 3240 parts of aqueous ethylene chlorhydrin (30%), about 28 parts of calcium carbonate, and about 72 parts of bentonite, filtering, treating the filtrate with about 300 parts of sodium carbonate at about 70° to about 80° C., filtering, extracting the filtrate with ether, distilling off the ether, and distilling the residue in vacuo.

2. The process which comprises boiling 2:5 dimethoxyaniline, aqueous ethylene chlorhydrin (30%), calcium carbonate, and an inert dispersing agent, filtering, treating the filtrate with sodium carbonate at about 70 to about 80° C., filtering, and extracting the dihydroxydiethyl product from the filtrate.

3. A process which comprises boiling under reflux with agitation about 160 parts by weight cresidine, about 1625 parts of aqueous ethylene chlorhydrin (30%), about 145 parts of calcium carbonate, and about 36 parts bentonite, filtering, heating with about 150 parts of sodium carbonate at 70° to 80° C., filtering, separating the oil and distilling off water by steam at superatmospheric pressure, and distilling the residue in vacuo.

4. The process which comprises boiling cresidine, aqueous ethylene chlorhydrin, an acid buffer and an inert dispersing agent, filtering, heating with sodium carbonate at 70° to 80° C., filtering, separating the oil, removing water therefrom and distilling the residue in vacuo.

5. The process which comprises boiling cresidine, ethylene chlorhydrin, and an acid buffer, heating with sodium carbonate, and segregating the dihydroxydiethyl product.

6. The process which comprises boiling one of a group of compounds consisting of p-alkyl-o-aminophenylalkyl-ether, p-alkoxy-o-aminophenylalkyl-ether, and p-halogen-o-aminophenyl-alkyl-ether with ethylene chlorhydrin, calcium carbonate, and an inert dispersing agent, filtering and separating out the dihydroxydiethyl reaction product.

7. The process which comprises boiling a mixture containing essentially one of a group of compounds consisting of p-alkyl-o-aminophenyl-alkyl-ether, p-alkoxy-o-aminophenylalkyl-ether, and p-halogen-o-aminophenylalkyl-ether with ethylene chlorhydrin, an acid buffer, and an inert dispersing agent, and separating out the dihydroxydiethyl reaction product.

8. The process which comprises reacting one of a group of compounds consisting of p-alkyl-o-aminophenylalkyl-ether, p-alkoxy-o-aminophenylalkyl-ether, and p-halogen-o-aminophenylalkyl-ether with ethylene chlorhydrin in an aqueous solution containing a mild base.

9. A compound having the formula:

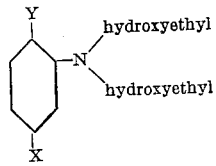

in which X is one of a group consisting of alkyl, alkoxy, or halogen, and Y is alkoxy.

10. A compound having the formula shown in claim 9 in which X is one of a group consisting of alkyl, alkoxy, or halogen, and Y is methoxy.

11. A compound having the formula shown in claim 9 in which X is one of a group consisting of alkyl, alkoxy, or halogen, and Y is ethoxy.

12. A compound having the formula shown in claim 9 in which X is alkyl and Y is alkoxy.

13. A compound having the formula shown in claim 9 in which X is alkoxy and Y is alkoxy.

14. A compound having the formula shown in claim 9 in which X is halogen and Y is alkoxy.

15. A compound having the formula shown in claim 9 in which X is methoxy and Y is alkoxy.

16. A compound having the formula shown in claim 9 in which X is ethoxy and Y is alkoxy.

17. N-beta beta'-dihydroxydiethyl-2,5-dimethoxy-aniline being a pale yellow viscous oil boiling at 208–216° C. at 6 mm. of mercury.

18. N-beta beta'-dihydroxydiethyl-cresidine being an almost colorless viscous oil boiling at 188–190° C. at 5 mm. mercury.

19. The process which comprises reacting a compound represented by the formula

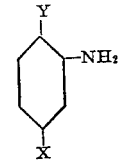

in which X is one of a group consisting of alkyl, alkoxy, or halogen, and Y is alkoxy, with ethylene chlorhydrin in an aqueous solution containing a mild alkali.

ALFRED WILLIAM BALDWIN.
ARTHUR HOWARD KNIGHT.

CERTIFICATE OF CORRECTION.

Patent No. 2,044,045.                                                                             June 16, 1936.

ALFRED WILLIAM BALDWIN, ET AL.

It is hereby certified that error appears in the printed specification of the above numbered patent requiring correction as follows: Page 2, first column, line 35-36, claim 3, for the word "superatmospheric" read subatmospheric; and that the said Letters Patent should be read with this correction therein that the same may conform to the record of the case in the Patent Office.

Signed and sealed this 11th of August, A. D. 1936.

Henry Van Arsdale (Seal)                          Acting Commissioner of Patents.